June 9, 1942.  W. L. MORRISON ET AL  2,285,998
WATER HEATING DEVICE
Filed April 7, 1939  4 Sheets-Sheet 4
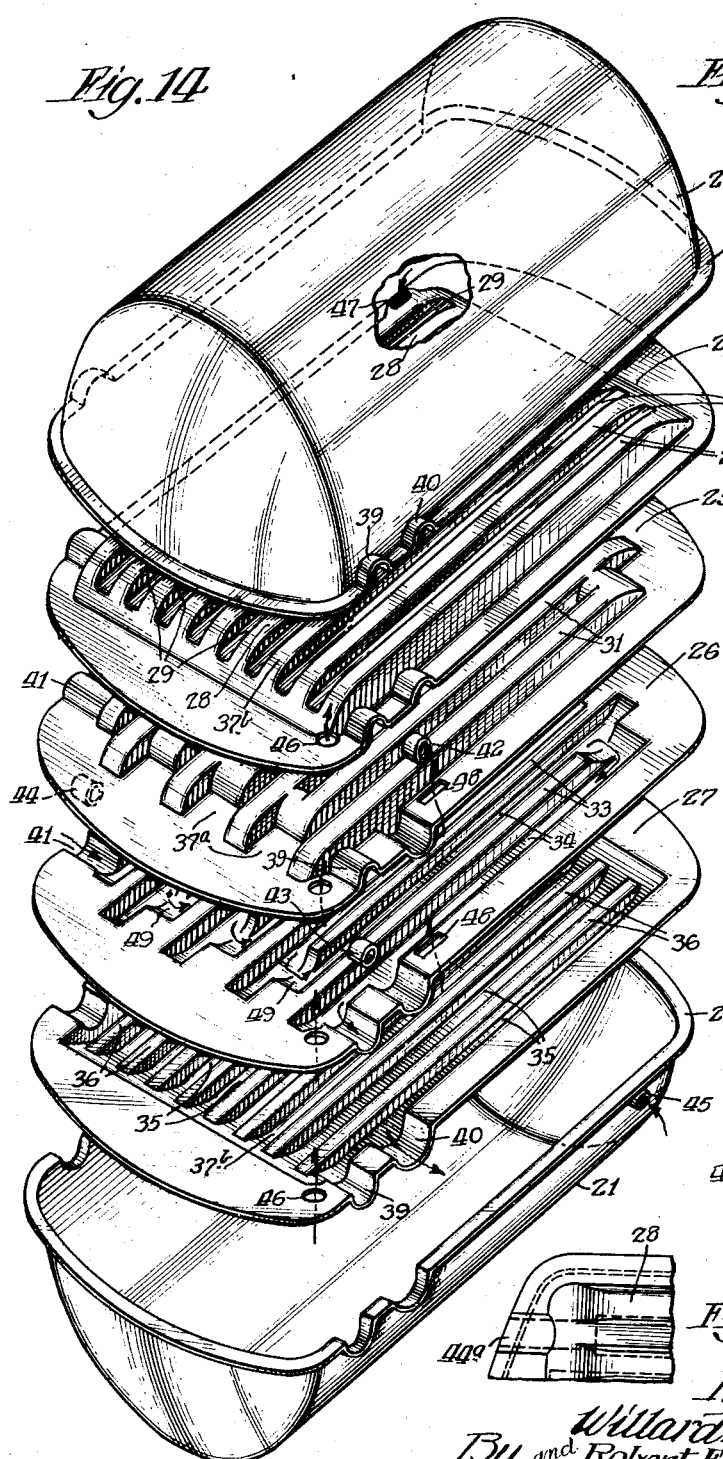
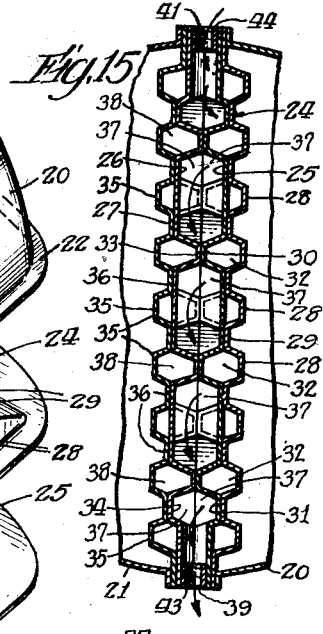
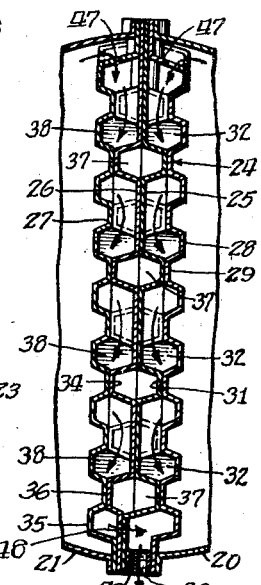
Inventors:
Willard L. Morrison
and Robert E. Moore
By Parker & Carter Attys Patented June 9, 1942

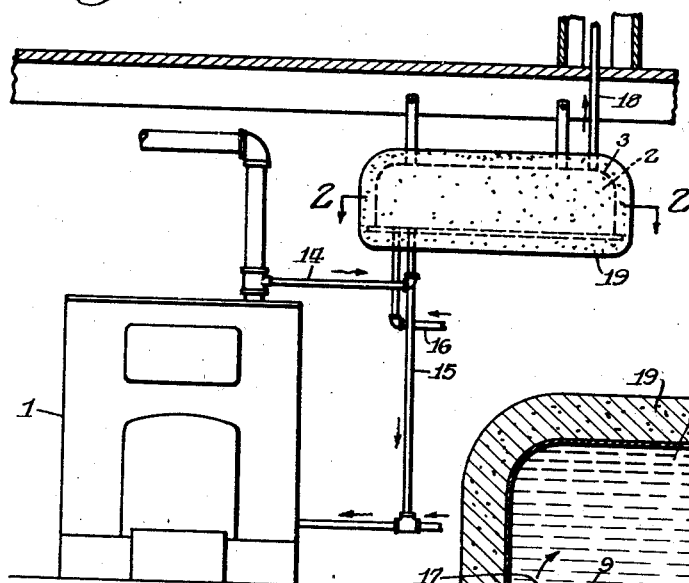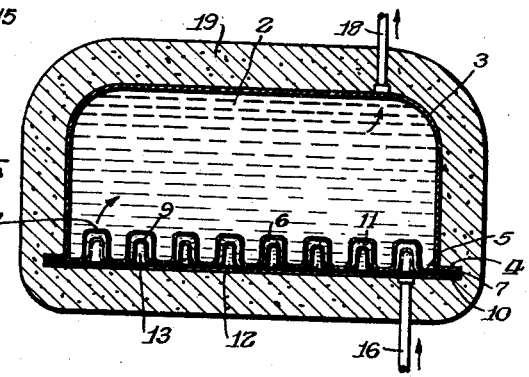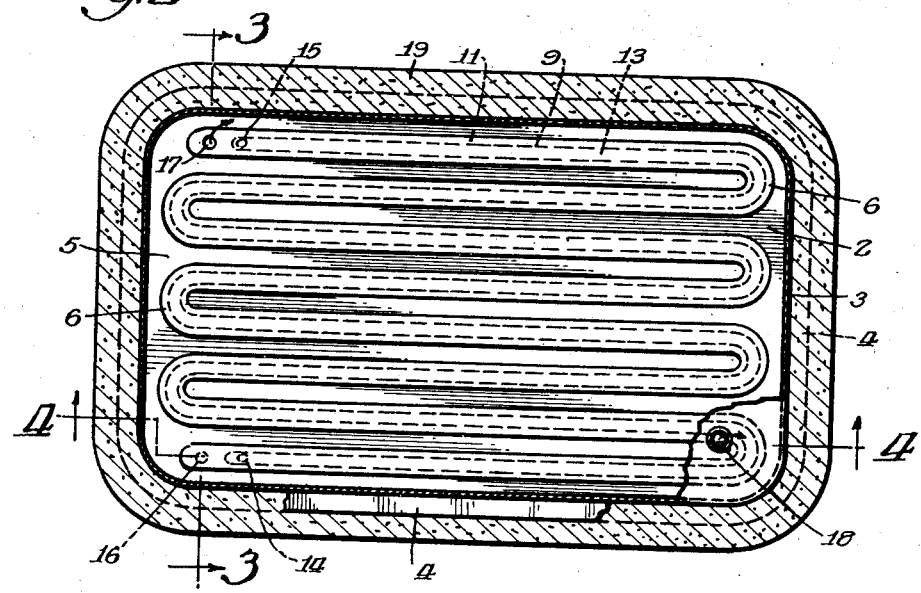

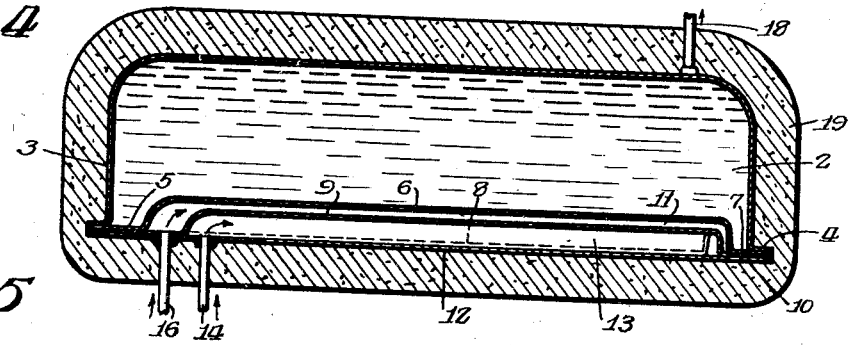
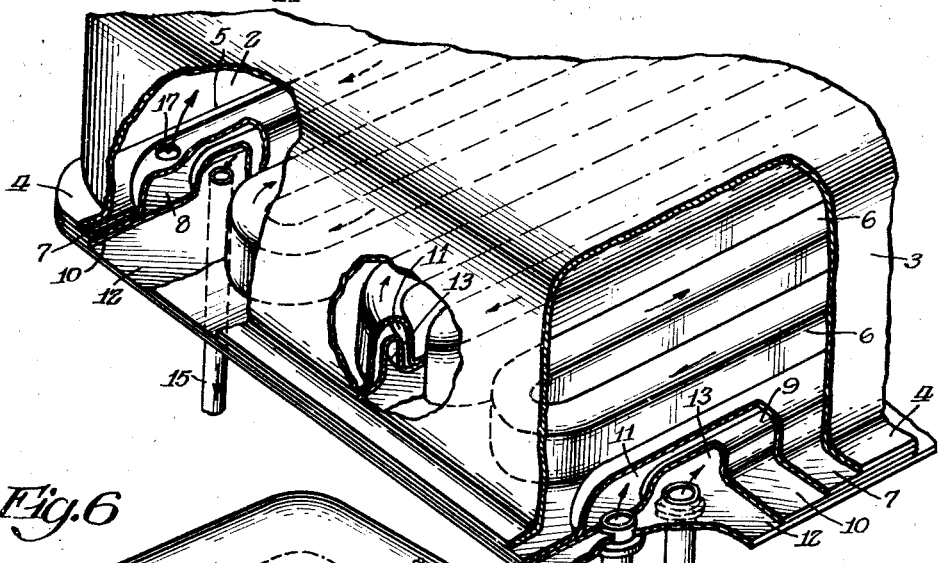
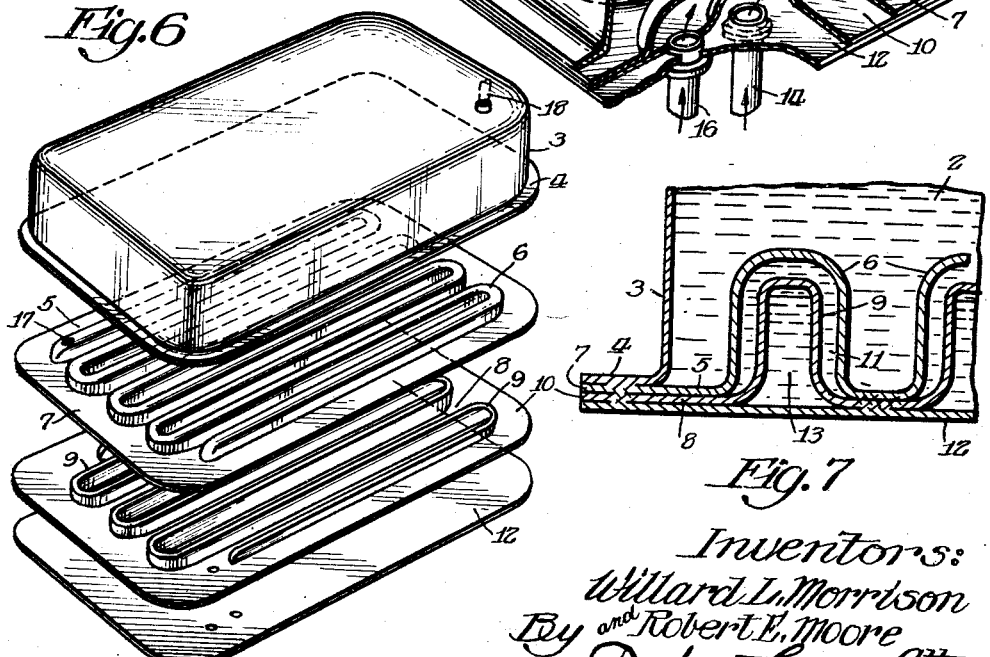

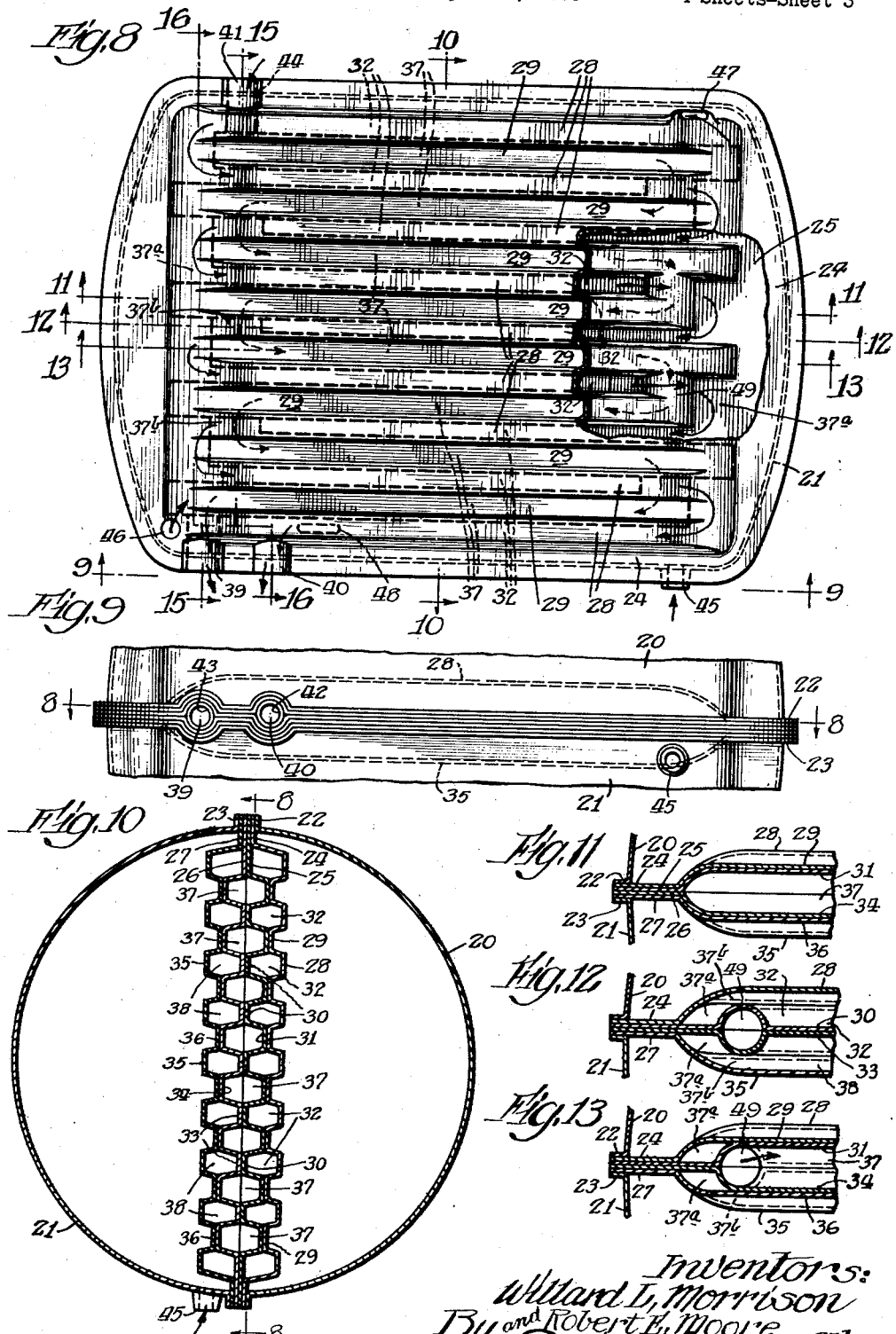

2,285,998

UNITED STATES PATENT OFFICE 2,285,998

WATER HEATING DEVICE

Willard L. Morrison, Lake Forest, and Robert Edwin Moore, Park Ridge, Ill.

Application April 7, 1939, Serial No. 266,480

6 Claims. (Cl. 257—245)

This invention relates to water heating devices and has for its object to provide a new and improved device of this description.

The invention has as a further object to provide a water heating device made up of a series of parts all of which can be stamped from metal and connected together.

The invention has as a further object to provide a water heating device wherein the passageway through which the heating water passes, is formed integral with the metal.

The invention has as a further object to provide a water heating device made up of a plurality of stamped sheets of metal fastened together, with a plurality of separate passageways formed into the metal.

The invention has as a further object to provide a water heating device with a relatively large area of primary heating surface.

The invention has as a further object to provide a water heating device which can be cheaply manufactured and which shall be efficient in operation.

The invention has other objects which will be more particularly pointed out in the specification.

Referring now to the drawings,

Fig. 1 is a diagrammatic view showing one form of water heating device embodying the invention;

Fig. 2 is an enlarged sectional view taken on line 2—2 of Fig. 1;

Fig. 3 is a sectional view taken on line 3—3 of Fig. 2;

Fig. 4 is a sectional view taken on line 4—4 of Fig. 2;

Fig. 5 is a perspective view of the device illustrated in Figs. 1 to 4, with parts broken away;

Fig. 6 is a view showing the several sheets of material after being stamped and before being fastened together, but in position to be fastened together;

Fig. 7 is an enlarged sectional view showing a small portion of the device illustrated in Fig. 6 when the sheets are connected together;

Fig. 8 is a side elevational view of a modified construction, taken on line 8—8 of Figs. 9 and 10, with one semi-cylinder of the reservoir removed and a portion of one of the cold water supply sheets broken away to expose one of the boiler water passageway sheets;

Fig. 9 is a bottom elevation of the central portion of Fig. 8, with portions of the reservoir broken away and taken on the line 9—9 of Fig. 8, showing the several stampings and threaded bushings in place and welded together at the flanges to form the complete tank and heater;

Fig. 10 is a vertical sectional view taken on line 10—10 of Fig. 8;

Fig. 11 is a sectional view with parts broken away and taken on line 11—11 of Fig. 8, showing the boiler water passageway;

Fig. 12 is a sectional view with parts broken away and taken on line 12—12 of Fig. 8, showing the cold water supply passageway and the cylindrical portion connecting adjacent boiler water passageways;

Fig. 13 is a sectional view with parts broken away, taken on the line 13—13 of Fig. 8, showing the communicating boiler water passageway stampings, the cold water supply passageway stampings, and the cold water supply passageway cross conduit formed at the ends therefrom;

Fig. 14 is a perspective view of the various stampings and threaded bushings, separated and in their proper assembly relationship to be welded together at their marginal edges to form a liquid tight combined water heater and reservoir;

Fig. 15 is a sectional view, with the reservoir broken away, taken on line 15—15 of Fig. 8, showing particularly the passageways and circuit for the boiler water circulation and their inlet and outlet connections formed by the opposed stampings.

Fig. 16 is a sectional view, with the reservoir broken away, taken on line 16—16 of Fig. 8, showing particularly the passageways and circuit for the cold water supply and their inlet and outlet connections formed by the opposed stampings;

Fig. 17 is a view of the upper lefthand portion of Fig. 8, showing the admission of the boiler water at the end instead of the top.

Like numerals refer to like parts throughout the several figures.

As illustrated in the drawings, we provide a hot water heating element which is composed of two or more sheets of heat conducting material, with depressions or grooves indented in the faces thereof and which form passageways when the sheets are fastened together, through which the water or other liquid is transmitted. Furthermore, these passageways produced by these indentations or grooves in the sheets of material may be arranged so that a different portion or body of water can be passed back and forth through one set of passageways and another portion or body of water passed back and forth through another set of passageways, the passageways being arranged so as to allow a free interchange of heat between the two portions or bodies of liquid. These sheets are preferably provided with laterally extending flanges and there is also provided a reservoir which may be made in one or two pieces having laterally extending flanges, and the device is quickly and easily assembled by fastening these flanges together, either by welding, spotwelding, riveting, or in any other suitable manner, the sheets and parts when fastened together forming a reservoir in which one liquid is heated by another and stored so that it can be drawn off and used at any point of use desired. The drawings illustrate one form of making such a device where the parts are all stamped out of sheet metal.

Referring now to the drawings, there is illustrated in Fig. 1 one form of the invention with the associated parts in connection with which it is used. In this construction there is a boiler 1 which is used to heat water for any purpose, such as for a heating system. In this construction water from the boiler 1 does not go to the point of use, but is circulated and recirculated through the boiler and is used to heat water to be sent to the point of use. This water to be thus heated is in a reservoir 2. In Figs. 1 to 7 this reservoir is made up of four metal sheets, stamped or otherwise shaped to the desired shape. It can be made of any desired number of sheets and as shown in the rest of the figures, there are illustrated six sheets. It is of course evident that any other number of sheets may be used.

In this construction of Figs. 1 to 7, there is a sheet 3 bent into shape to form a reservoir and having a laterally projecting flange 4. There is a sheet 5, which is formed with a series of grooves or passageways formed by forming into the metal a series of hollow ribs 6 united at their ends. This sheet is also provided with a flange 7. There is also a sheet 8, formed with a series of grooves or passageways formed by forming into the metal a series of hollow ribs 9 united at their ends, and which is also provided with a flange 10. The ribs 6 and 9 are so formed that they extend back and forth across the sheets, being continuous so that the hollow space in them is a continuous space from the end of the rib at one edge of the sheet to the other end at the other edge of the sheet. The ribs 9 are smaller than the ribs 6 and when the parts are assembled, fit into them as illustrated in Fig. 3, thus forming a passageway 11 between the two sets of ribs, which extends back and forth across the reservoir. There is a sheet 12 which forms the bottom of this particular reservoir and when the parts are assembled, this sheet closes the bottom of the hollow spaces in the ribs 9 so as to form another passageway 13 extending back and forth across the reservoir. The flanges 4, 7 and 10 and the edge of the sheet 12 are all fastened together to form a water tight joint, as by brazing, welding, riveting, or in any other desired manner, as shown in Figs. 1, 4 and 5.

The water from the boiler 1 passes through the pipe 14 into the passageway 13 between the ribs 9 and the sheet 12, see Fig. 5, and then passes along this passageway and passes out through the pipe 15 and returns to the boiler. The water to be heated passes from any suitable source of supply through a pipe 16 into the passageway 11 formed between the ribs 9 and 6 and it then passes along this passageway and is heated by the boiler water passing through the passageway 13 and passes out through the opening 17 into the space in the reservoir above the ribs 6, so as to fill this reservoir with hot water. The hot water is conducted from the reservoir by a pipe 18 to the place where it is used. The reservoir is preferably covered with heat insulating material 19.

In the construction shown in Figs. 8 to 17 we have shown a series of sheets formed with passageways struck into the metal, so that the water from the boiler and the water to be heated pass back and forth across the reservoir several times while in heat exchange relationship, thus providing a more efficient heating of the water and a device which will heat larger quantities of water. It is of course understood that any number of these different sheets may be used, depending upon the conditions presented, the amount of water to be heated and the temperature to which the water is to be heated, the number of sheets which we have shown in these figures being simply illustrative.

Referring now to these Figures 8 to 17, we provide two outer sections 20 and 21 which are formed of sheets shaped to contain a considerable quantity of water, that is to form a storage place for the heated water. These sheets have flanges 22 and 23, see Fig. 14. There are four intermediate sheets 24, 25, 26 and 27. The sheets 24 and 25 are formed with ribs, so that they may be said to be corrugated. The sheet 24 has ribs 28 which extend in one direction and ribs 29 which extend in the opposite direction, as clearly shown in Fig. 10. The sheet 25 has ribs 30 which extend in one direction and ribs 31 which extend in the opposite direction. The ribs 28 of the sheet 24 and ribs 30 of the sheet 25 are opposed to each other so as to form a continuous passageway 32 extending back and forth across the reservoir.

The sheet 26 is provided with ribs 33 which extend in one direction and ribs 34 which extend in the opposite direction. The sheet 27 is provided with ribs 35 which extend in one direction and ribs 36 which extend in the opposite direction. The ribs 34 of the sheet 26 are opposite the ribs 31 of the sheet 25, thereby forming a continuous passageway 37 which extends back and forth across the reservoir. The ribs 35 of sheet 27 are opposite the ribs 33 of sheet 26, thereby forming a continuous passageway 38 extending back and forth across the reservoir. The passageway 37 is connected at the ends by the passageways 49, Figs. 11, 12, 13, 14.

In assembling the device, the flanges of the several parts are placed together and are fastened in position either by welding, riveting, or in any other desired manner. One of the advantages of this construction is that all the sheets can be welded at the same time, as their edges are all overlapping. It will be seen that these sheets can be easily and quickly assembled and fastened together to form a water tight reservoir. These various parts of course may be manufactured in any desired manner, but would ordinarily be manufactured by stamping or pressing, and they may be made out of any metal desired, such as iron, steel, stainless steel, or copper, and the reservoir may be made up of the same kind of metal or of different kinds of metal if desired, but whatever the metal, the same machine may be used to form the sheets.

Another advantage of this construction is that the sheets when stamped may be stamped so as to form the inlet and outlet openings 39, 40 and 41, by bending the metal at these points, the metal of the sheets on one side being bent in one direction and on the other side being bent in the other direction, so that when the sheets are assembled, these openings are formed, as clearly shown in Fig. 9, and at the time the parts are assembled, pipes 42, 43 and 44 may be clamped and fastened or welded in position in these openings. These pipes may be internally threaded before or after being welded in position, so that connecting pipes may be easily attached thereto. The several sheets may be connected together in any other manner than that shown and the inlets and outlets may also be formed in any other manner desired.

In tanks now in use, pipes are placed therein through which the boiler water passes, and these pipes are bent back and forth into coils, and it is found that sediment easily clogs in the bends of the pipes as the size of the passageway through the pipes is the same from one end to the other. In this device the parts may be stamped so that the passageways are larger at the ends, as shown at 37a and 37b, Fig. 8, than in the straightaway portions, giving a very distinct advantage to this device and also making it easy for the water at these enlarged ends to pass around the passageways for the other water.

When the parts are assembled, the water from the boiler passes in through the opening 41 and pipe 44, see Figs. 8 and 15, and then passes back and forth along the passageway 37 and through the enlarged ends 37a of the passageway and then out through the pipe 43. The water to be heated passes in the inlet 45, see Fig. 10 and into the section 21, where it passes along the outside of the central passageways and passes up to the top of the reservoir, being heated during this passage. Some of the water at the same time passes through the opening 46, see Figs. 8 and 14, to the other side of the central passageways, into the part 20 and passes up to the top thereof in the same way. This water then passes through the openings 47 into the passageways 32 and 38 and then passes back and forth through these passageways, where it is in heat exchange relation to the boiler water passing through the passageway 37, so as to become heated thereby, and then passes out through the outlet 40 and pipe 42 to the point of use. Passageway 32 is connected directly to outlet 40 and passageway 38 is connected by the opening 48 with the outlet 40, see Figs. 14 and 16.

The reservoir is preferably located at a point higher than the boiler and the boiler is connected to the inner or central heater element, that is the part containing the passageways, at the top and the bottom, so that water will flow therethrough continuously by thermosyphonic action.

Water heating devices as now commercially used are made of iron and they gradually rust or become clogged with sediment and in many cases reservoirs of the type herein set out, in the event they are made of iron and rust, can be thrown away and a new one installed at less cost than the cost required to take apart and clean one of the water heating reservoirs as now manufactured.

It will further be noted that our device permits the use of inner plates of copper and outer plates of iron as shown, for example, in all of the figures and that the sheet stampings can be made thick if desired, all of which increases the life of the device.

Furthermore, in this device there is a large amount of primary heat exchange surface available. For example, a primary surface of over ten feet may be secured with a comparatively small tank, say a tank of fourteen inches across by fifty-six inches long, the length being reckoned parallel with the corrugations of the plates. Furthermore, this large amount of heat exchange surface in the present reservoir is greatly increased over the heat exchange surface of the prior constructions.

Instead of having the opening for the admission of the hot water enter the upper face of the device, there may be provided an opening 44a at the upper part of the end, as shown in Fig. 17, for the admission of this hot water. This admission opening can be made the same way, by bending the overlapping edges so that it will not be necessary to perforate any of the plates. This location, among other things, makes it easier to fasten the pipe from the boiler in position when the reservoir is close to the ceiling.

It will be seen that particularly as illustrated in Figs. 14 to 17, there is here provided a hot water reservoir formed of two sheets, each one being, for example, substantially half of a cylinder, and that these two sections are placed in position to enclose the other sheets containing the water passageways, and that all of the sheets can be united in a single operation by securing the flanges together, to form a tank in which water enters the reservoir at a point near its lower portion and fills the two semi-cylindrical members. There is a discharge pipe connected to the middle heat interchanger containing the passageways, so that when water is admitted to the reservoir and is drawn off, the water will move from the top of the tank into the heat exchange passageways, thereby passing in direct contact with the walls of the passageways containing the hot water from the boiler, so that each time water is withdrawn, it will pass through the entire length of the heat exchange passageways before being discharged from the reservoir. It will also be noted that the warmest water in the semi-cylindrical members is at the top and that this water then enters the heat exchange passageways, that is the hottest water in the reservoir semi-cylindrical sections passing first into the heat exchange passageways.

We claim:

1. A water heating device comprising a reservoir having outer walls, sheets of heat conducting material within said outer walls, having hollow ribs integral therewith and extending back and forth across the sheets, the ribbed sheets being joined together with the ribs of one sheet opposite the ribs of the other sheet, forming separated passageways extending back and forth across the sheets, said passageways having outlet in proximity to each other and having inlets for connecting one of said passageways with water to be heated and another passageway with hot water, the water to be heated receiving heat from the hot water, both of the said inlets to said passageways being at the ends thereof.

2. A water heating device comprising a reservoir having outer walls, sheets of heat conducting material within said outer walls, having hollow ribs integral therewith and extending back and forth across the sheets, the ribbed sheets being joined together with the ribs of one sheet opposite the ribs of the other sheet, forming separated passageways extending back and forth across the sheets, inlets for connecting one of said passageways with water to be heated and another passageway with hot water, the water to be heated receiving heat from the hot water, both of the inlets of said passageways being at the ends thereof, and outlets for both the hot water and the water to be heated, both of said outlets being at the ends of said passageways and in proximity to each other.

3. A water heating device comprising a reservoir made out of a plurality of sheets of heat conducting material, each of a plurality of said sheets having two separated passageways extending back and forth across the sheets, said passageways consisting of substantially parallel grooves extending back and forth across said sheets, and means for connecting the ends of the grooves of each of said passageways together to form the two separated passageways.

4. A water heating device comprising a reservoir comprising outer and inner sheets of heat conducting material, the outer sheets having water receiving receptacles therein, each of the inner sheets having a series of oppositely projecting hollow ribs, the oppositely projecting ribs of adjacent sheets being in engagement so that the hollows of the ribs are brought together to form a plurality of passageways extending back and forth across the sheets, said passageways located between the water receiving receptacles formed by the outer sheets, means for admitting the cold water to be heated into said receiving receptacles, and means for admitting hot water is one of said passageways and water to be heated in another of said passageways.

5. A water heating device comprising a reservoir comprising outer and innner sheets of heat conducting material, the outer sheets having enlarged water receiving receptacles therein, said outer sheets having four inner sheets between them, each of said inner sheets having a series of oppositely projecting hollow ribs, the oppositely projecting ribs of adjacent sheets being in engagement so that the hollows of the associated ribs constitute three passageways extending back and forth across the sheets, a central passageway and a passageway on each side of the central passageway, an admission opening for admitting hot water at one end of the central passageway and admission openings in the ends of the other two passageways for admitting water to be heated from said receiving receptacles into said two passageways, and discharge means for discharging water from the other ends of the three passageways.

6. A water heating device comprising a reservoir comprising outer and inner sheets of heat conducting material, the outer sheets having enlarged water receiving receptacles therein, said outer sheets having four inner sheets between them, each of said inner sheets having a series of oppositely projecting hollow ribs, the oppositely projecting ribs of adjacent sheets being in engagement so that the hollows of the associated ribs constitute three passageways extending back and forth across the sheets, a central passageway, and a passageway on each side of the central passageway, an admission opening for admitting hot water being provided at one end of the central passageway and admission openings being provided in the ends of the other two passageways for admitting water to be heated from said receiving receptacles into said two passageways, and discharge means for discharging water from the other ends of the three passageways, the reservoir being provided with means for admitting the water to be heated into the water receiving receptacles of the outer sheets, at the portion thereof opposite the admission openings in said three passageways, so that it must pass along the inner sheets to the said admission openings before entering the passageways formed by said inner sheets.

WILLARD L. MORRISON.
ROBERT EDWIN MOORE.